Patented Feb. 21, 1928.

1,659,906

UNITED STATES PATENT OFFICE.

CHARLES BOGIN, OF TERRE HAUTE, INDIANA, ASSIGNOR TO COMMERCIAL SOLVENTS CORPORATION, OF TERRE HAUTE, INDIANA, A CORPORATION OF MARYLAND.

NITROCELLULOSE COMPOSITION.

No Drawing. Application filed August 14, 1925. Serial No. 50,259.

My invention pertains to nitrocellulose compositions and relates specifically to the formation of plastic masses, films, and lacquers containing nitrocellulose. As is well known in the art, nitrocellulose itself is unsuitable for the formation of plastic masses (such as celluloid), films, and lacquers, on account of its brittle non-plastic nature.

In the production of plastic masses and films from nitrocellulose it has for years been the custom to incorporate a plasticizer or softener with the nitrocellulose. For example camphor is a suitable solvent, in the presence of heat, for nitrocellulose and has been incorporated with nitrocellulose for the formation of plastic masses, films, and lacquers. A great number of substitutes for camphor have been proposed and used in a like manner.

In some cases these plasticizers have been used for the direct solution of nitrocellulose. In other cases the plasticizer has been incorporated with the nitrocellulose by the aid of a mutual solvent or solvent mixture, which, in the case of plastic mass and film production is subsequently removed by evaporation and which, in the case of lacquers, is allowed to remain until the lacquer is applied.

A plasticizing agent for employment in the production of nitrocellulose lacquers and nitrocellulose films should be possessed of the following properties:—

(a) It should be a solvent for nitrocellulose,
(b) It should be a neutral stable material which does not decompose on aging,
(c) It should be absolutely non-volatile under ordinary atmospheric conditions.

I have now discovered that the dibutyl ester of mesotartaric acid is a highly suitable material for employment as a nitrocellulose plasticizer in the production of plastic masses, films, lacquers, etc. Mesotartaric acid is an organic acid having an empirical formula identical with the true tartaric acids (dextro, laevo, and racemic) but having a different molecular configuration. It is a white crystalline substance melting at 140–143°. Dibutyl mesotartrate may easily be prepared by mixing molecular proportions of butyl alcohol and mesotartaric acid in the presence of heat and a catalyst such as hydrochloric acid gas. The yield obtainable by ordinary methods of esterification is in the neighborhood of 90% of the theoretical.

Dibutyl mesotartrate, unlike the butyl esters of tartaric acid, is a crystalline solid melting at about 48–50° C. It boils at about 205° C. under 20 mm. vacuum. It is neutral to methyl orange indicator and is soluble in water to the extent of 1–2%. It is a good solvent for nitrocellulose.

The method of employment of dibutyl mesotartrate as a nitrocellulose plasticizer is best illustrated by specific examples of use.

*Example 1.—Plastic masses.*

In the production of plastic masses the nitrocellulose is dissolved in a suitable solvent such as acetone, only sufficient solvent being used to reduce the nitrocellulose to a viscous semi-liquid mass. Dibutyl mesotartrate is then added in amounts varying from 75% to 300% of the weight of the nitrocellulose, dependent on the degree of plasticity desired. The solvent mixture is then evaporated off by passing the mass over heated rolls or in other similar manner, and the plastic mass is moulded under heat and pressure.

*Example 2.—Films.*

In the production of films from mixtures of nitrocellulose and dibutyl mesotartrate the ingredients may be incorporated in a manner similar to that described under Example 1. More solvent may be added to reduce the viscosity of the mass and the resultant solution may be flowed out in shallow trays whereupon the evaporation of the solvent causes the production of a film. This procedure may be modified and various types of film-forming machinery, known to those skilled in the art, may be employed.

*Example 3.—Lacquers.*

Nitrocellulose lacquers may consist merely of a solution of nitrocellulose in a mixture of volatile solvents. In such a case the evaporation of the solvent mixture causes the formation of a film of nitrocellulose. On account of the brittleness of nitrocellulose—per se—dibutyl mesotartrate is added in amounts varying from 50–100% of the weight of the nitrocellulose, the exact amount being dependent on the degree of plasticity desired.

However nitrocellulose itself in solution of sufficiently low viscosity to be successfully applied as a lacquer does not give sufficient body to be an economical surface covering. Also the adherence of the film to the undersurface is inclined to be poor. For these and other reasons, gums such as dammar, kauri, shellac, congo, and ester are incorporated in the lacquer. Pigments, dyes, or lakes, are also ordinarily introduced.

The solvent mixture employed as a lacquer vehicle must hold both nitrocellulose and gums in solution. Since nitrocellulose is best dissolved in esters such as ethyl or butyl acetate, and since most of the gums are most soluble in alcohols or hydrocarbons, the solvent mixture ordinarily contains esters, alcohols, and hydrocarbons. To attain smoothness of flow and retarded evaporation, high-boiling solvents such as butyl or amyl acetate must be present. A typical lacquer formula in which dibutyl mesotartrate is present as the plasticizer follows:

8 ounces nitrocellulose (lacquer cotton).
4 ounces dibutyl mesotartrate.
8 ounces gums (dammar and ester).
1 quart ethyl acetate.
1 quart butyl acetate.
1 quart benzol.
1 quart toluol.

If desired, various pigments may be incorporated.

I am aware of the fact that in the past, dibutyl tartrate and other esters of tartaric acid have been employed as nitrocellulose solvents and plasticizers, and I make no claim to the use of such compounds. Dibutyl mesotartrate, is an entirely separate chemical substance having different physical and chemical properties from the esters of tartaric acid and it is the employment of this specific substance as a nitrocellulose plasticizer to which my invention and application is directed.

Now, having fully described my invention, I claim the following as new and novel:—

1. A composition of matter comprising nitrocellulose and dibutyl mesotartrate.
2. A composition of matter comprising 100 parts nitrocellulose and 50–300 parts of dibutyl mesotartrate.
3. A composition of matter comprising nitrocellulose, dibutyl mesotartrate and a solvent mixture.
4. A lacquer film comprising nitrocellulose, dibutyl mesotartrate and gum.
5. A lacquer film comprising nitrocellulose, dibutyl mesotartrate, gum, and a pigment.
6. A lacquer solution comprising nitrocellulose, dibutyl mesotartrate, gum, and a solvent mixture.
7. A lacquer solution comprising nitrocellulose, dibutyl mesotartrate, gum and a solvent mixture containing esters, alcohols, and hydrocarbons.

In testimony whereof I affix my signature.

CHARLES BOGIN